(12) United States Patent
Neitzke

(10) Patent No.: US 7,674,414 B2
(45) Date of Patent: Mar. 9, 2010

(54) IN MOLD LAMINATION OF DECORATIVE PRODUCTS

(75) Inventor: Mark K. Neitzke, Waterford, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 255 days.

(21) Appl. No.: 11/428,107

(22) Filed: Jun. 30, 2006

(65) Prior Publication Data

US 2007/0141353 A1 Jun. 21, 2007

Related U.S. Application Data

(63) Continuation of application No. PCT/US2005/000170, filed on Jan. 3, 2005.

(60) Provisional application No. 60/533,632, filed on Dec. 31, 2003.

(51) Int. Cl.
*B29C 45/16* (2006.01)

(52) U.S. Cl. .................. 264/241; 264/255; 264/259; 264/271.1; 264/275

(58) Field of Classification Search .................. None
See application file for complete search history.

(56) References Cited

U.S. PATENT DOCUMENTS

| | | | |
|---|---|---|---|
| 3,654,062 A | 4/1972 | Loew | |
| 3,873,656 A * | 3/1975 | Garner | ........................ 264/55 |
| 4,010,057 A | 3/1977 | Nakanishi | |
| 4,349,592 A | 9/1982 | Nussbaum | |
| 4,396,680 A | 8/1983 | Chang | |
| 4,460,534 A | 7/1984 | Boehm et al. | |
| 4,681,811 A | 7/1987 | Simpson et al. | |
| 4,849,145 A * | 7/1989 | Hirsch | ........................ 264/46.4 |
| 5,009,821 A | 4/1991 | Weaver | |
| 5,049,345 A | 9/1991 | Collette et al. | |
| 5,320,869 A | 6/1994 | Eisfeller et al. | |
| 5,338,592 A | 8/1994 | Ohsumi et al. | |
| 5,350,608 A | 9/1994 | Zoller | |
| 5,352,532 A | 10/1994 | Kline | |
| 5,432,666 A | 7/1995 | Hodge | |
| 5,525,179 A | 6/1996 | Stickling | |

(Continued)

FOREIGN PATENT DOCUMENTS

DE 4124297 C2 1/1993

(Continued)

OTHER PUBLICATIONS

Corrected International Search Report and Written Opinion dated Jun. 27, 2005 corresponding with International Application No. PCT/US05/00170 filed Jan. 3, 2005. 13pgs.

(Continued)

*Primary Examiner*—Monica A Huson
(74) *Attorney, Agent, or Firm*—Grossman, Tucker, Perreault & Pfleger, PLLC

(57) ABSTRACT

A method of manufacturing decorative plastic composites having a decorative layer, a backing layer and a clear outer layer which provides exceptional "depth of image" is disclosed. Decorative or protective appliqués' having a wide range of decorative patterns may be formed by injection molding a backing layer behind and a clear outer layer on the top surface of a thin foil, film, fabric or veneer.

20 Claims, 5 Drawing Sheets

U.S. PATENT DOCUMENTS

| | | |
|---|---|---|
| 5,641,547 A | 6/1997 | Dilley |
| 5,651,998 A * | 7/1997 | Bertschi et al. ............. 425/127 |
| 5,811,169 A | 9/1998 | Ohsumi et al. |
| 5,863,479 A | 1/1999 | Ohsumi et al. |
| 6,129,985 A | 10/2000 | Ohsumi et al. |
| 6,444,317 B1 | 9/2002 | Haruta et al. |
| 6,444,319 B1 | 9/2002 | Berg et al. |
| 6,468,458 B1 | 10/2002 | Anderson et al. |
| 6,660,337 B2 | 12/2003 | Haruta et al. |
| 6,733,870 B2 | 5/2004 | Enlow et al. |
| 6,787,094 B2 | 9/2004 | Collette et al. |
| 6,800,325 B2 | 10/2004 | Ehrath et al. |
| 6,841,107 B2 | 1/2005 | Peters et al. |
| 6,987,144 B2 | 1/2006 | Anderson et al. |
| 7,128,859 B2 | 10/2006 | Peters et al. |
| 7,214,340 B2 | 5/2007 | Berg et al. |
| 2002/0007898 A1 | 1/2002 | Spica |
| 2002/0157772 A1 | 10/2002 | Enlow et al. |
| 2003/0044598 A1 | 3/2003 | Berg et al. |
| 2004/0101668 A1 | 5/2004 | Peters et al. |
| 2004/0110895 A1 | 6/2004 | Anderson et al. |
| 2005/0276874 A1 | 12/2005 | Menaldo et al. |

FOREIGN PATENT DOCUMENTS

| | | |
|---|---|---|
| DE | 43 01 444 C2 | 8/1995 |
| DE | 20 2004 019 298 U1 | 3/2005 |
| DE | 20 2004 001 133 U1 | 9/2005 |
| DE | 10 2004 035 758 A1 | 3/2006 |
| DE | 10 2004 035 759 A1 | 3/2006 |
| DE | 10 2005 033 051 A1 | 1/2007 |
| DE | 20 2005 021 105 U1 | 3/2007 |
| EP | 0 607 968 B2 | 1/2003 |
| EP | 1147872 B1 | 9/2005 |
| WO | WO2005070647 A1 | 8/2005 |

OTHER PUBLICATIONS

Joseph Ogando. Spirol. "Wood Joins Electonics Enclosure Materials". www.designnews.com. © 2004, Reed Business Information, a division of Reed Elsevier Inc. Internet printout dated Oct. 13, 2004. 3pgs.

International Search Report and The Written Opinion Of The International Searching Authority; date of mailing Mar. 25, 2008; issued in the corresponding International Appln. No. PCT/US07/78802 filed Sep. 18, 2007.

* cited by examiner

IN MOLD LAMINATION OF DECORATIVE PRODUCTS

CROSS REFERENCE TO RELATED APPLICATIONS

This application is a continuation of International Application No. PCT/US2005/000170 filed Jan. 3, 2005 and published Aug. 4, 2005 as International Publication No. WO 2005/070647, designating the United States, and which claims benefit of U.S. Provisional Application No. 60/533,632 filed Dec. 31, 2003.

FIELD OF THE INVENTION

This invention relates to plastic composites formed by injection molding, particularly to plastic composites which find use as decorative appliqués for motor vehicle trim, and more particularly, to decorative appliqués having a wide variety of decorative patterns which exhibit exceptional "depth of image" provided by a layer of relatively clear plastic forming the outer surface.

BACKGROUND OF THE INVENTION

Transportation vehicles, particularly automobiles, are marketed and sold on the basis of differentiation over other competitive models. Differentiation may be by style or color, and is often accomplished by using trim panels or appliqués on the interior or exterior of the vehicle which denote different levels of luxury, price or value. These appliqués or panels may also form protective coverings for areas that protrude from adjacent surfaces. These panels are generally color-coordinated with the adjacent surfaces of the vehicle but may also be bright, reflective, wood grained, marbleized or metallized in appearance.

Originally, real wood appliqués and finished metal panels were used, however, their popularity suffered due to their high cost and limited durability. Subsequently, wood veneers and films with vacuum-deposited metal layers found favor, however, these solutions did not produce the look of luxury or the extended durability required in today's market.

Various proposals have been suggested and practiced for the manufacture of plastic composites for use as automotive interior trim and exterior trim panels or appliqués. One approach has been to form a metal or plastic substrate and apply multiple coatings thereon to produce a high gloss Class A-surfaced part. The substrates may be formed from steel, or any one of a wide range of known plastic materials such as ABS, PP, ABS/PC blends, PU, TPO, PET, PBT or other equivalent high strength plastic materials suitable for injection molding into a product shape. The coatings for such substrates may be selected from known coatings such a primer coat, an adhesion promoter, a base coat and a clear coat, and in the case of metals, an electrodeposition coat. Examples of such coatings are set forth in U.S. Pat. Nos. 4,681,811 and 5,320,869. The solvents used in such systems may cause undesirable environmental and emission problems.

Another approach is to form a paint film and inject polymeric material behind the paint film to produce a part with a desired colormatch on its exposed Class A surface. Examples of known paint film and injection molded plastic parts are disclosed in U.S. Pat. Nos. 5,432,666 and 5,009,821. Such systems may require the separate manufacture and handling of the film. Furthermore, the outer surface being a paint film may not exhibit an exceptional depth of image and may be readily scratched or abraded.

Still another approach to providing a colored plastic part is to provide an enamel coating that will reduce emissions while producing a crater resistant surface on the part being coated. One such system is set forth in U.S. Pat. No. 4,396,680. Such systems may require the use of expensive conventional coating systems and baking ovens to form a finish on the substrate that has the desired appearance.

Yet another approach is to provide laminating equipment in which a color layer is formed by extrusion and then connected to a substrate. U.S. Pat. No. 4,349,592 discloses the use of such a technique in the manufacture of a decorative molding exterior trim part.

Various other proposals have been suggested to produce decorative trim parts and appliqués which have unique decorative patterns, high distinctness of image (DOI) and exceptional "depth of image" which give the impression of luxury and high value. "Depth of image" is herein defined as the emphasis of a decorative pattern by a preferably clear resin layer overlying it, which provides the appearance that the pattern lies deep beneath the top surface of the clear outer layer. This is derived from wood finishing where multiple layers of wax or coatings are applied and buffed out to provide a grain pattern that appears to lie well below the top surface or has depth.

For instance, U.S. Pat. No. 5,338,592 is directed at laminating a series of wood veneers to form an overlay sheet, finishing, cutting and drying the overlay to form a shape, molding a transparent resin layer onto the front surface of the wooden shape and molding a synthetic resin core material onto the rear surface of a wooden shape. However, the effort of forming the wooden veneer overlay to the desired shape is both time consuming and costly.

Similarly, U.S. Pat. No. 5,525,179 is directed at manufacturing a lining part comprising a blank having a preformed shape and a cutout with an edge, injection molding a first plastic material to form a back surface, followed by injection molding a second plastic material to form a front surface coating which also coats the edges of the part. Again, a preformed shape is disclosed.

As disclosed in the '179 reference, German Published Application 41 24 297 describes a similar process using a preshaped blank and employing polymethyl-methacrylate (PMMA) as the outer layer. However, this reference does not disclose the use of a plastic backing layer.

U.S. Pat. No. 6,444,317 is directed at preparing a laminate film including a polyolefin film layer and a primer layer and injection molding a polyolefin resin onto the polyolefin film layer to form an outer layer.

Regarding decorative wood articles, U.S. Pat. No. 6,444,319 assigned to Erwin Behr, GmbH & Co. is directed at surface coating of an interior fitting for vehicles with a lacquer or resin layer wherein a wood veneer component is inserted into a mold and spaced from the cavity so that a liquid surface coating material having at least two mixed components may be introduced into the space between the mold and wood veneer component. United States Patent Application Publications Nos. 2003/0044598 and 2003/0162045, also to Behr, disclose the use of a liquid coating material curable by UV radiation, and the application of a coating material based on vegetable-oil-modified resin and natural vegetable oils, with the addition to the coating material of ceramic microparticles, respectively.

Finally, United States Patent Application Publication No. 2002/0007898 is directed at a method of making a molded wood part having a wood grain pattern wherein a wood fiber substrate is formed, coated with a water impermeable substrate and a pattern transferred to the substrate using a hydrographic process. A protective top coat may be applied over the pattern. One example of a hydrographic process is disclosed in U.S. Pat. No. 4,010,057 wherein a thin film on which a pattern is printed is floated on the surface of a liquid and the pattern is transferred onto the surface of the object by submerging the surface of the object in the liquid.

While the various methods are suitable for their intended purpose, they all involve processing considerations that either produce emissions, require heavy capital investment in facilities or require unnecessary handling of one or more layers of material in the manufacture of a decorative exterior or interior trim product and do not produce an exceptional depth of image of the decorative layer.

Thus, there is a continuing need in this field of art for an article and its method of manufacture that will obviate the above problems.

SUMMARY OF THE INVENTION

The present invention relates to a production method for providing a trim panel or appliqué wherein a decorative layer is positioned between two mold halves and a plastic material is injection molded against one surface of the decorative layer to form a decorative composite. Subsequently, the decorative composite is transferred to a second tool where a, preferably clear, plastic material is injection molded against the other side of the decorative layer.

The plastic materials may be of the same or different composition, but preferably one of the materials is a relatively clear transparent plastic which when provided at an appropriate thickness, yields an appearance of the decorative layer lying under the top surface of the clear layer, thus having an exceptional depth of image.

The decorative layer may comprise a wide variety of thin materials to distinguish its appearance, including, but not limited to; fabric, wood, foil, metal and plastic. The process may be carried out using multiple mold cores and covers to form the plastic layers on each side of the decorative layer. In this instance, the decorative composite laminate is formed in one mold set and travels with a first mold core to subsequently align with a second mold cover to provide a cavity space for molding an outer layer against the outer or top side of the decorative layer. Alternatively, the decorative composite may be demolded from the first mold set and placed in a second mold set having a cavity space which will allow the molding of a plastic material against the other side of the decorative layer.

In a most preferred embodiment, the injection mold core and cavity are designed with a extended shear edge which allows the aligned core and cavity to be separated, after the decorative layer and base layer have been formed, by an amount substantially equal to the thickness of the clear outer layer, to form the final composite structure for an appliqué or trim panel.

Accordingly, it is an object of the present invention to provide a method of providing trim panels or appliqués having a wide variety of decorative patterns covered by an outer layer of injection molded, preferably clear, plastic which provides an exceptional depth of image and luxurious appearance.

It is a further object of the present invention to provide appliqués and trim panels having an injection molded outer layer which provides an exceptional depth of image and luxurious appearance.

It is a still further object of the present invention to form appliqués and trim panels having a distinctive appearance wherein one or more of the injection molded or decorative layers include pigments, metallic flakes, tints, and/or reflective fibers which provide a unique color effect.

Another object of the present invention is to provide a tool design for an injection mold whereby an extended shear edge allows the same mold set to be used to provide successive layers of injection molded plastic on both sides of a decorative layer.

It is a further object of the present invention to form appliqués or trim panels having exceptional depth of image wherein the decorative layer is formed to final shape by the injection molding of the first, preferably clear, material against it.

It is a still further object of the present invention to provide a process for producing appliqués or trim panels having exceptional depth of image and decorative alternatives which are much thinner in cross-section than are presently available.

It is a still further object of the present invention to provide fastening means for thin-walled decorative appliqués or trim panels.

Still other objects and advantages of the present invention will become readily apparent to those skilled in the art from the following detailed description, wherein it is shown and described preferred embodiments of the invention. As will be realized the invention is capable of other and different embodiments, and its several details are capable of modification in various respects, without departing from the invention. Accordingly, the description is to be regarded as illustrative in nature and not as restrictive.

BRIEF DESCRIPTION OF THE DRAWINGS

The features, operation and advantages of the invention may be better understood from the following detailed description of the preferred embodiments taken in conjunction with the attached drawings, in which.

BEST MODE FOR CARRYING OUT THE INVENTION

Figure 1:
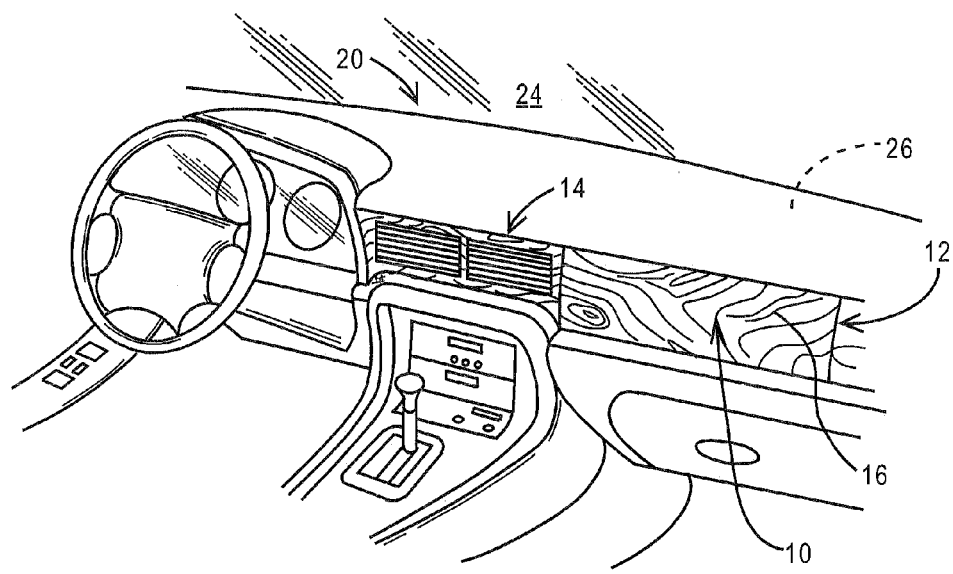
FIG. 1 is a perspective view of an automobile instrument panel including an appliqué of the present invention.

Decorative panels in the form of appliqués and bezels are found in many markets; automotive, appliance, marine, furniture, etc. Some of these panels also function as protective trim strips along the sides of boats and cars to prevent minor bumping damage. These panels may take on any appearance to differentiate the product which they are installed upon. Protective trim appliqués are often bright, reflective metal-appearing laminates or extrusions with a plastic outer layer. Popular inside the vehicle are "real wood" appliqués that use a preformed wood laminate which is coated with a clear plastic layer. A key to these wood-appearing products is the relatively thick outer coating which yields a luxurious, expensive-appearing image. The present invention provides a molding process for producing thin appliqués having exceptional decorative appearance and depth without the need to preshape the decorative layer prior to molding. An appliqué of this type is shown at 10 in FIG. 1. FIG. 1 is a perspective view of the driver's side of an automobile cockpit with the main instrument panel 20 shown beneath a windshield 24. Beneath the instrument panel, typically, there is a hidden airbag deployment system 26 whose presence is not evident on the top surface. Decorating the surface of the instrument panel 20, are three coordinated appliqués 10, 12 and 14 which include a wood grain pattern 16 that flows smoothly from panel to panel. Often this wood appearance flows completely across the instrument panel and along the door panels, along each side of the vehicle. By providing an appliqué with the appearance of lightly buffed expensive wood, the interior appearance of the vehicle is enhanced and differentiated.

Figure 2:
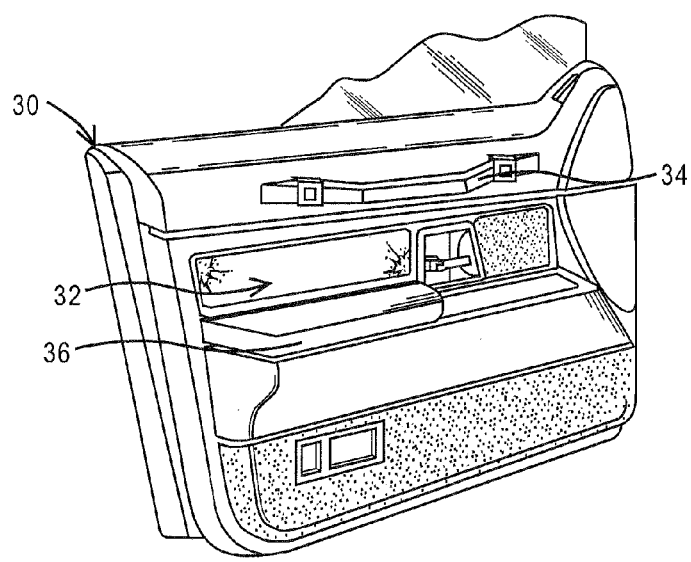
FIG. 2 is a perspective view of an automobile door panel including an appliqué of the present invention

A second decorative appliqué is shown in FIG. 2 where a door panel 30 which includes a grab handle 34 and armrest 36 further includes a decorative appliqué 32, in this case having the appearance of a coarsely woven burlap type fabric, appearing to be deeply encased in a clear plastic layer. Other applications for the method and construction of the present invention are equally suitable as protective or decorative strips or panels on the outside of other vehicles, appliances, etc.

Figure 3:
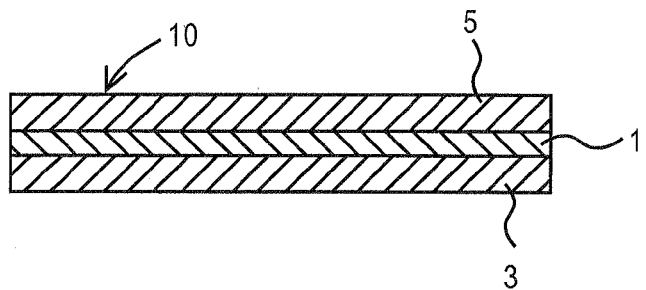
FIG. 3 is an enlarged cross-sectional view of an appliqué or trim panel of the present invention.

The construction of the appliqué or trim panel of the present invention is shown in simplified cross-sectional view in FIG. 3. The layers as shown are exaggerated in thickness for clarity of the discussion. The relative dimensions of the layers may not be as depicted.

Here, an appliqué 10 comprises a decorative layer 1 having a front side and a back side, which may include, but is not limited to, a foil, film, fabric, veneer, coating or thin laminate which is covered with a layer 3 of a first plastic on its back side and has a top layer 5 overlying its front side. The top layer 5 is preferably injection molded of a clear plastic at a thickness to provide the desired depth of image and to protect the thin decorative layer 1. The backing layer 3 is also injection molded and may be of nearly any plastic material and may be tinted, pigmented or otherwise decorated to enhance the appearance of the decorative layer 1, if so desired. Likewise, the top layer 5 may be tinted, pigmented or otherwise decorated to yield a specific appearance as desired. As noted above, typical decorative materials include, but, are not limited to, cloth or fabrics, metallized or painted films, wood grain veneers, laminates formed by hydrographic or metal deposition processes, etc.

Figure 4:
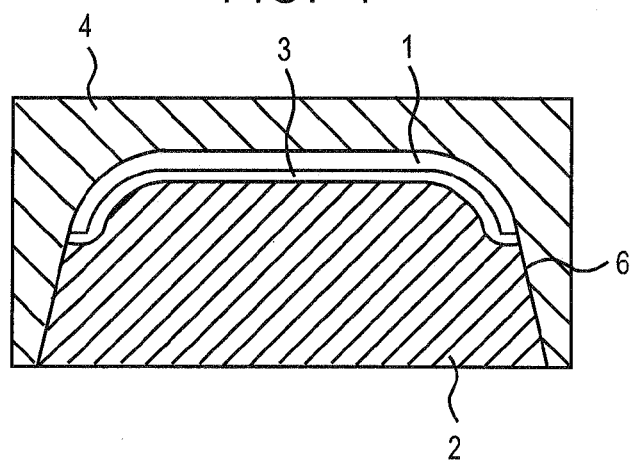
FIG. 4 is a simplified cross-sectional view of an apparatus to form the decorative base layer of one embodiment of the present invention.

A key to the present invention is an uncomplicated process for forming thin appliqués or trim panels. In a preferred embodiment as shown in FIG. 4, a decorative layer 1 is positioned between mold halves. When mold core 2 is aligned with the mold cover 4 there is a resulting cavity space formed for a first plastic 3 to be injection molded behind the decorative layer 1. This causes the decorative layer 1 to conform to the shape of the mold cover 4 and for the first plastic to fill out the space between the core 2 and cover 4. The core 2 and cover 4 are aligned by a shear edge 6 which extends around the projected core 2 and closely interfaces with the cover 4. In a preferred embodiment the shear edge 6 is lengthened so that an additional top layer 5 may be injected (see FIG. 5) by withdrawing the core 2 out of the cover 4 by an amount, a. The decorative layer 1 in FIG. 4 may be cut to conform to the dimensions of the space between the core 2 and cover 4 or may extend across the land area of the cover 4 and be held in place, or even cut off by the core 2 along the shear edge 6 when the core 2 and cover 4 are aligned.

Figure 5:
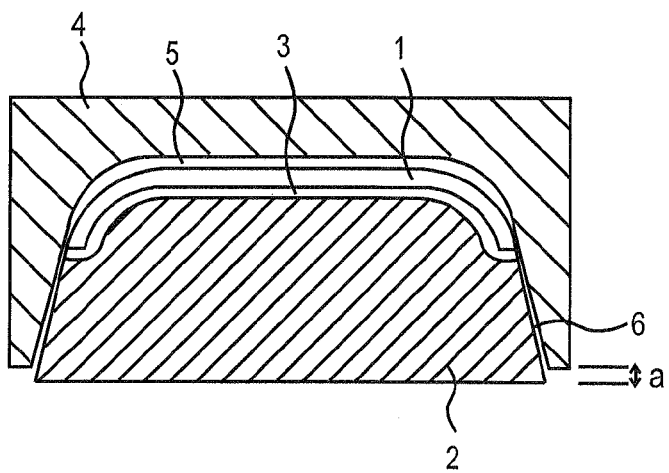
FIG. 5 is a simplified cross-sectional view of an apparatus to form the composite appliqué of one embodiment of the present invention.

Turning to FIG. 5, it is shown that the core 2 of FIG. 4 has been retracted out of the cover 4 portion of the mold set by an amount, a, which is preferably substantially equal to the thickness of the top layer 5 of the appliqué 10. This allows the preferably clear outer layer 5 to be injected over the decorative composite formed by the decorative layer 1 and backing layer 3. The preferably clear outer layer 5 may comprise any of the clear, preferably light stable, plastics available in the art, including but not limited to, polycarbonate, polymethylmethacrylate, thermoplastic urethane, polyester, copolyester alloys, cyclic olefin copolymer, poly-4-methyl-1-pentene, polysulphone, allyl diglycol carbonate, allyl ester, styreneacrylonitrile, polystyrene and polyvinyl chloride.

Preferably, the clear plastic outer layer 5 comprises a copolymer and more particularly a cyclic olefin copolymer, such as TOPAS® 6015S-04 from Ticona, or a co-polyester alloy, such as OPTIMUM® 800 Grade from Engineered Plastics Corporation. The appliqué 10 as formed by the method of the present invention may be of any thickness suitable for the application for which the appliqué is intended, typically from about 1.0 mm. to about 5.0 mm. with a clear outer layer 5 typically of about 0.5 mm. to about 1.0 mm. in thickness, depending on the molding properties of the clear resin used for the outer layer 5.

Unique to the specific construction and method of the present invention is the ability to mold the appliqué 10 in a single mold set (core 2, cover 4) without having to exchange mold halves to accommodate the outer layer 5. Also unique is the ability to produce very thin appliqués, of about 1 mm. in thickness by a single injection mold set.

Figure 6:
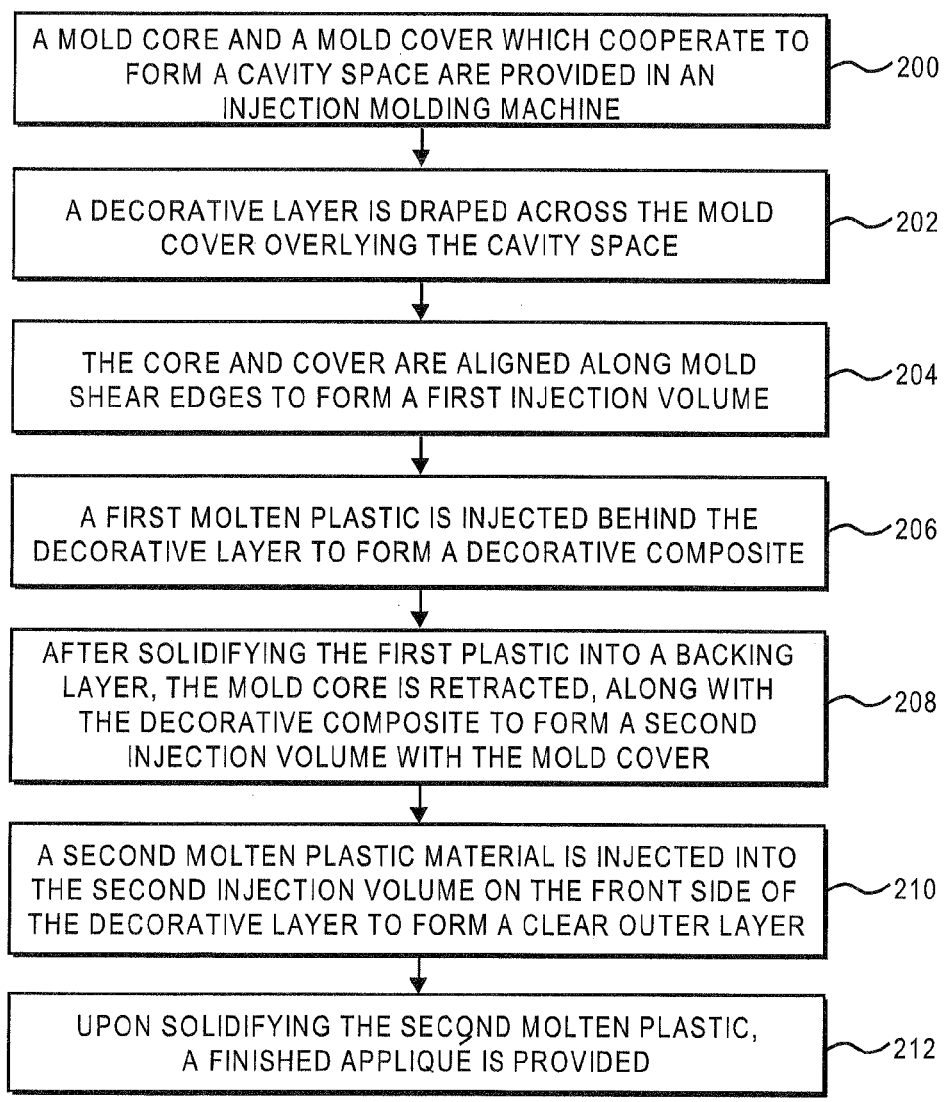
FIG. 6 is a block diagram reciting the steps of a preferred molding process.

The process of a preferred embodiment of the present invention preferably comprises (see FIG. 6) the steps of providing a mold core and cover, which cooperate to form a cavity space, in an injection molding machine (Block 200); positioning a, preferably thin, decorative layer 1 across the mold cover 4 which includes a contoured surface (Block 202); aligning the mold core 2, having a contoured surface which mates with, but is spaced from, the contoured surface of the mold cover, with the mold cover 4 to form a first injection volume (Block 204); injecting a first plastic as a backing layer 3 on to the back side of the decorative layer 1 and into the injection volume to conform the decorative layer 1 to the cover portion and form a decorative composite (Block 206); solidifying the first plastic material and retracting the core 2 along with the composite formed by the decorative layer 1 and first plastic 3 (Block 208) along lengthened shear edges which allow the tooling to remain substantially sealed; injecting a second plastic onto the front surface of the decorative layer 1 to form a preferably clear top layer 5 (Block 210); solidifying the second plastic layer 5 and demolding and trimming the appliqué (Block 212). The invention may also be accomplished by injecting the clear layer on the front side of the decorative layer first (at Block 206), retracting the mold core away from the decorative composite, and injecting the backing layer (at Block 210). Further, it is contemplated that an appliqué' may be similarly formed by co-injecting the two plastic materials on to both the front and back sides of the decorative at substantially the same time and allowing the injection pressure to open the mold halves to form the finished appliqué', or optionally to fill the cavity space between the mold halves without moving the mold halves.

Appliqués of the present invention may also preferably include fastening means for attachment to other surfaces, including but not limited to, hook and loop, molded bosses which interact with Palnuts, molded Xmas tree projections, and sections which snap-fit into adjacent or mounting surfaces. Alternately, the fastening features may include dielocks, undercuts and various other female features known in the art.

Figure 7:
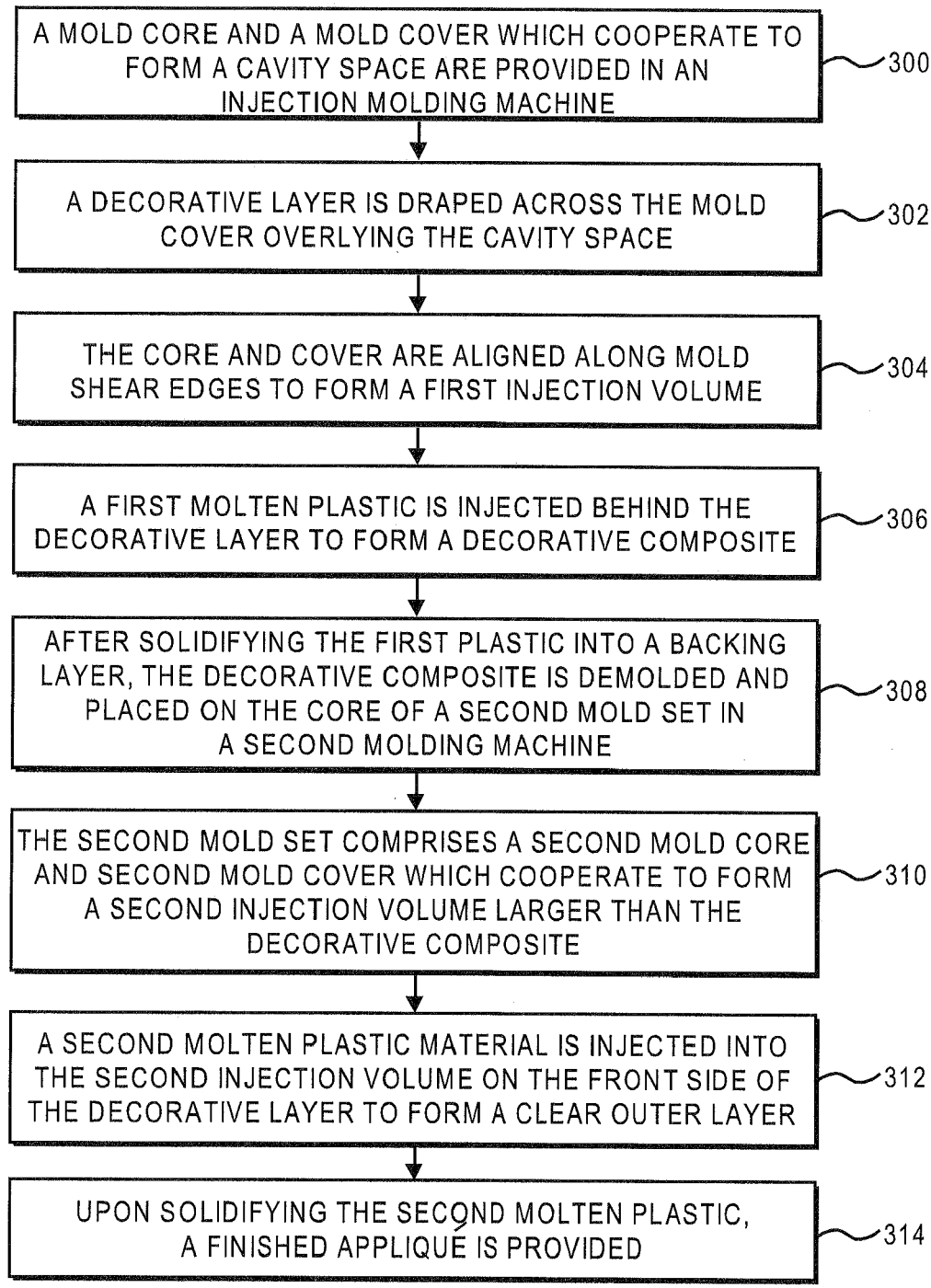
FIG. 7 is a block diagram reciting an alternative molding process.

An alternate method of forming the appliqué of the present invention involves a 2 stage process as described in FIG. 7. Here, a first mold core 2 having a contoured projecting portion and a first mold cover 4 having a similarly contoured, preferably recessed, portion spaced from the core are aligned to form an injection volume for forming a decorative composite layer (Block 300). A decorative layer 1 is positioned between the contoured portions of the mold cover 4 and mold core 2 (Block 302), the mold core 2 and cover 4 are aligned and closed (Block 304) and a first plastic material injected on to the back side of the decorative layer 1 to form a backing layer 3 (Block 306). Upon solidifying, the decorative composite formed of decorative layer 1 and backing layer 3 is removed from the molds and placed into a second set of molds comprising core 2A and cover 4A (Block 308). Typically, the contoured projecting portion of the core 2A may be slightly smaller in dimension than that of core 2 to accommodate any shrinkage of the backing layer. Core 2A and cover 4A cooperate to define a second injection volume between the mold halves which is greater than the volume of the decorative composite (Block 310). A second plastic material, preferably clear, is injected into the space between the mold cover 4A and the composite layer outer surface to form a protective outer layer 5 (Block 312). Upon solidifying the outer layer 5, the appliqué 10 may be removed from the mold 2A,4A and trimmed (Block 314). Alternatively, the outer layer 5 may be injected against the decorative layer first (at Block 306) and subsequently the backing layer may be injected in the second tool set (at Block 312).

Figure 8:
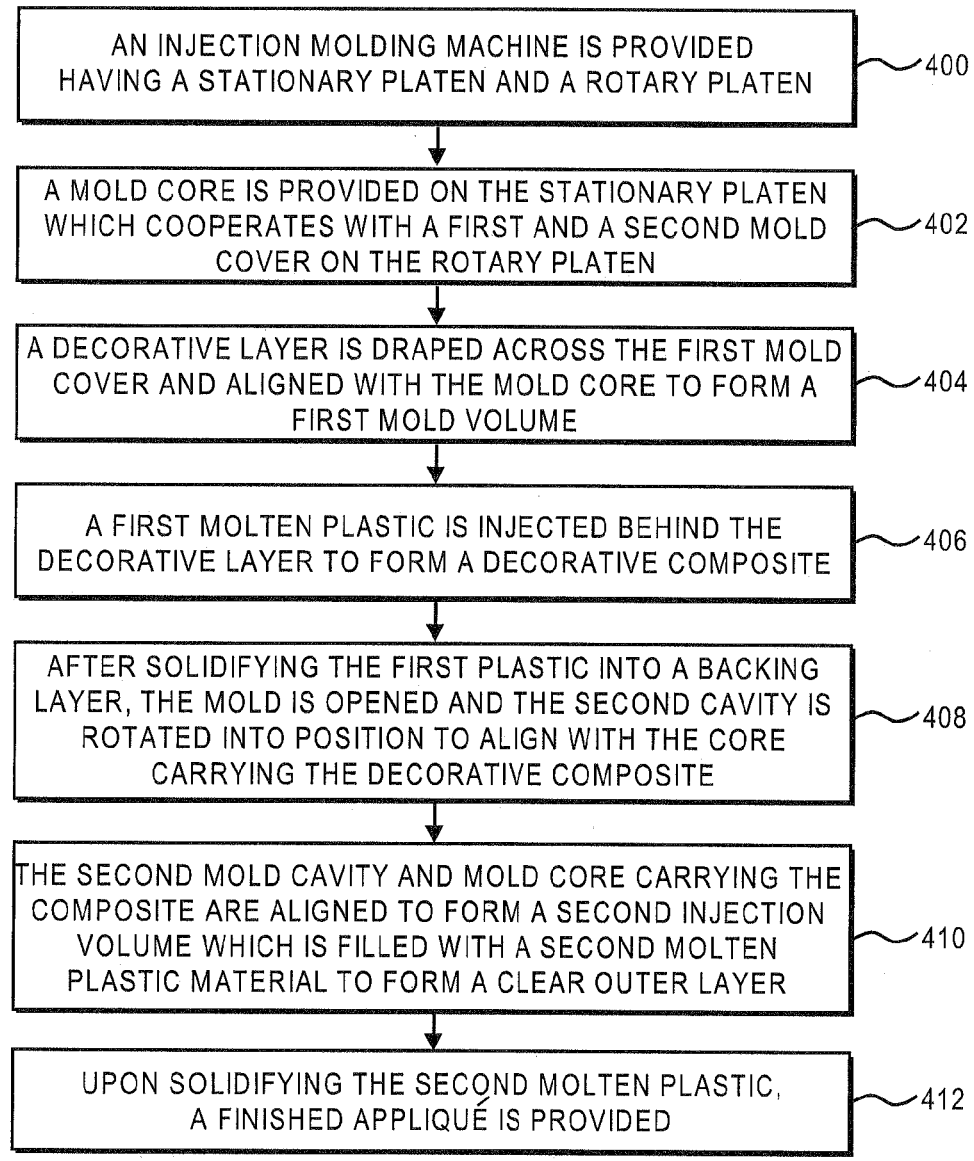
FIG. 8 is a block diagram reciting still another alternate molding process.

A third method for alternatively forming an appliqué of the present invention is disclosed in U.S. Pat. No. 6,468,458, commonly assigned to the assignee of the present invention and included herein by reference. This method, as shown in FIG. 8, includes a two part mold system wherein one of the mold parts is moveable (Block 400) and includes mold covers having contoured, preferably, cavity portions and the other of the mold parts is stationary and may include a mold core having a similar contoured surface spaced from the cover. The mold covers and core cooperate to form different injection volumes (Block 402, Block 404) to accommodate injecting a first plastic behind a decorative layer using a first mold cover and first mold core (Block 406), and then aligning a second mold cover which provides a larger cavity area with the first mold core (Block 410) including the decorative composite to accommodate the subsequent injection of an outer layer (Block 410). Upon solidification the finished appliqué' is removed (Block 412). The moveable mold parts allow rotation of the mold covers, in this case, to align with the mold core to allow overshooting of the clear layer. This is described schematically in FIG. 8. Alternatively, the outer layer may be formed first in the cavity portion of a mold cover and subsequently that cover containing the decorative composite comprising the decorative layer and outer layer is aligned with a second mold core having a smaller contoured profile to allow the backing layer to be formed between the composite layer and the smaller contoured profile. Further, either of the mold parts, cores or covers, may be attached to either of the moveable or stationary mold platens. Preferably, the moveable mold part is carried on a rotary platen that allows the moveable mold part to rotate and align with the stationary mold parts. The moveable mold part carries the composite laminate from station to station and the stationary mold part has a profile that allows space for the injection of the subsequent layer to form the finished appliqué.

EXAMPLE 1

A thin wood veneer from Kimpara & Co., LTD. of Japan about 0.5 mm. in thickness was placed between the core and cover of an injection mold for an instrument panel appliqué-such as shown in FIG. 1.

A first plastic material, 5135 polypropylene from Huntsman, LLC was injected behind the wood veneer layer to conform the layer to the shape of a contoured cavity area in the mold cover and fill out the cavity space to form a backing layer. After solidifying the backing layer the core portion of the mold set was retracted 1.5 mm with the backing layer and decorative layer composite remaining tightly affixed to the mold core. The resulting cavity space formed by the retraction of the core from the cover was filled with a second polymer material, V825 poly(methylmethacrylate) from the Atoglas Division of Atofina, the chemical branch of TOTAL. Upon cooling and demolding the appliqué, a wood grained molding having a luxurious appearance was obtained.

EXAMPLE 2

Using the same molding set up as in Example 1, a section of coarsely woven fabric, a circular knit, WF0023 from Collins and Aikman Products Co. was positioned between the mold core and mold cover. TOPAS® 6015S-04, a cyclic olefin copolymer from Ticona, was injected behind the fabric to shape it to the contoured cavity space in the mold cover and back the fabric with clear polymer. Upon cooling, the mold core was retracted along with the combined fabric and backing layer and a second layer of cyclic olefin copolymer was injected into the open space, thus forming a protective top layer on the fabric. Upon cooling and demolding, a unique appearing appliqué was formed having an open weave fabric appearance buried deep in a clear layer

INDUSTRIAL APPLICABILITY

Thus, a thin walled decorative appliqué which may function as a decorative or protective surface or edging may be produced using an efficient molding process whereby a thin decorative layer is shaped by injecting a first plastic material, preferably as a backing layer, behind the decorative layer, and subsequently a second plastic material, preferably a clear polymer, is injected on the opposite side, preferably the front side of the decorative layer, to form an appliqué. Three preferred arrangements of mold alignment are disclosed, although other arrangements may be possible.

The appliqué formed by these methods is distinguished by a wide variety of thin decorative materials that may comprise the decorative layer, by additives in the form of tints, pigments and flakes that may be used in the injection molded layers to emphasize the decorative layer, by the use of, preferably, a clear polymer as the outer layer of the appliqué which provides a unique depth of image which further emphasizes the appearance of the underlying decorative layer, and by the forming of the thin decorative layer by the injection of the first plastic material.

Variations and modifications are possible without departing from the scope and spirit of the present invention as defined by the appended claims.

What is claimed is:

1. A method for manufacturing an appliqué having a decorative layer, a backing layer and an outer layer, comprising the steps of:
   (a) providing a mold core and a mold cover which cooperate to form a cavity space wherein said core and cover are aligned along one or more lengthened shearing edges which allow for the mold core and mold cover to remain substantially sealed and provide successive layers of injection molded plastic;
   (b) providing a decorative layer having a front side and a back side;
   (c) placing said decorative layer across said mold cover overlying at least a portion of said cavity space;
   (d) aligning said mold core and said mold cover to form a first injection volume therebetween;
   (e) injecting a first polymer against the backside of said decorative layer to substantially conform said decorative layer against the cover side of said first injection volume thereby forming a decorative composite comprising a backing layer at least partially formed behind said decorative layer;
   (f) solidifying said backing layer;
   (g) retracting said core and said decorative composite from said mold cover along said one or more lengthened shear edges by an amount related to the thickness "a" of an outer layer thereby forming a second injection volume;
   (h) injecting a second clear polymer into said second injection volume against the front side of said decorative layer to form an outer layer; and
   (i) solidifying said second polymer to form a molded appliqué,
   wherein said molded appliqué has a thickness in the range of about 1.0 mm. to about 5.0 mm. and said outer layer, "a", has a thickness in the range of about 0.5 mm. to about 1.0 mm.

2. The method of claim 1 wherein said clear polymer comprises any one of polycarbonate, poly(methyl methacrylate), thermoplastic urethane, polyester, copolyester alloy, cyclic olefin copolymer, poly-4-methyl-1-pentene, polysulphone, allyl diglycol carbonate, allyl ester, styrene-acrylonitrile, polystyrene, polyvinyl chloride and blends, alloys and combinations thereof.

3. The method of claim 1 wherein said decorative layer comprises one of a film, a foil, a laminate, a veneer, a fabric and a coating.

4. The method of claim 3 wherein said veneer includes a wood grain pattern.

5. The method of claim 1 wherein one or more of said first or said second polymers includes one or more pigments, tints, colored dyes, metallic flakes or light reflective particles blended therein.

6. A method for manufacturing an appliqué having a decorative layer, a backing layer and an outer layer, comprising the steps of:
   (a) providing a mold core and a mold cover which cooperate to form a cavity space wherein said core and cover are aligned along one or more lengthened shearing edges which allow for the mold core and mold cover to remain substantially sealed and provide successive layers of injection molded plastic;
   (b) providing a decorative layer having a front side and a back side;
   (c) placing said decorative layer across said mold cover overlying at least a portion of said cavity space;
   (d) aligning said mold core and said mold cover to form a first injection volume therebetween;
   (e) injecting a first clear polymer against the front side of said decorative layer to substantially conform said decorative layer against the core side of said first injection volume, thereby forming a decorative composite comprising an outer layer overlying said decorative composite;
   (f) solidifying said outer layer;
   (g) retracting said core along said one or more lengthened shear edges from said mold cover and said decorative composite by an amount equal to the thickness of a backing layer, thereby forming a second injection volume; and
   (h) injecting a second polymer into said second injection volume against the backside of said decorative layer to form a backing layer; and
   (i) solidifying said second polymer to form a molded appliqué,
   wherein said molded appliqué has a thickness in the range of about 1.0 mm. to about 5.0 mm. and said outer layer has a thickness in the range of about 0.5 mm. to about 1.0 mm.

7. The method of claim 6 wherein said clear polymer comprises any one of polycarbonate, poly(methyl methacrylate), thermoplastic urethane, polyester, copolyester alloy, cyclic olefin copolymer, poly-4-methyl-1-pentene, polysulphone, allyl diglycol carbonate, allyl ester, styrene-acrylonitrile, polystyrene, polyvinyl chloride and blends, alloys and combinations thereof.

8. The method of claim 6 wherein one or more of said first or said second polymers includes one or more pigments, tints, colored dyes, metallic flakes or light reflective particles blended therein.

9. The method of claim 6 wherein said decorative layer comprises one of a film, a foil, a laminate, a veneer, a fabric or a coating.

10. The method of claim 9 wherein said veneer includes a wood grain pattern.

11. A method for manufacturing an appliqué having a decorative layer, a backing layer and an outer layer, comprising the steps of:
   (a) providing a mold core and mold cover which cooperate to form a cavity space wherein said core and cover are aligned along one or more shearing edges;
   (b) providing a decorative layer having a front side and a back side;
   (c) placing said decorative layer across said mold cover overlying at least a portion of said cavity space;
   (d) aligning said mold core and said mold cover to form a first injection volume therebetween;
   (e) injecting a first clear polymer against the back side of said decorative layer to substantially conform said decorative layer against the cover side of said first injection volume thereby forming a decorative composite comprising a backing layer at least partially formed behind said decorative layer;
   (f) solidifying said backing layer;
   (g) retracting said core from said cover and removing said decorative composite;
   (h) providing a second mold core and second mold cover which cooperate to form a second cavity space;
   (i) placing said decorative composite upon said second mold core;
   (j) aligning the second mold cover and second mold core including said decorative composite to form a second injection volume;

(k) injecting a second polymer into said second injection volume against the front side of said decorative layer to form an outer layer; and (l) solidifying said second polymer to form a molded appliqué, wherein said molded appliqué has a thickness in the range of about 1.0 mm. to about 5.0 mm. and said outer layer has a thickness in the range of about 0.5 mm. to about 1.0 mm.

12. The method of claim 11 wherein said clear polymer comprises any one of polycarbonate, poly(methyl methacrylate), thermoplastic urethane, polyester, copolyester alloy, cyclic olefin copolymer, poly-4-methyl-1-pentene, polysulphone, allyl diglycol carbonate, allyl ester, styrene-acrylonitrile, polystyrene, polyvinyl chloride and blends, alloys and combinations thereof.

13. The method of claim 11 wherein one or more of said first or said second polymers includes one or more pigments, tints, colored dyes, metallic flakes or light reflective particles blended therein.

14. The method of claim 11 wherein said decorative layer comprises one of a film, a foil, a laminate, a veneer, a fabric or a coating.

15. The method of claim 14 wherein said veneer includes a wood grain pattern.

16. A method for manufacturing an appliqué having a decorative layer, a backing layer and an outer layer, comprising the steps of:

(a) providing a mold core and mold cover which cooperate to form a cavity space wherein said core and cover are aligned along one or more shearing edges;

(b) providing a decorative layer having a front side and a back side;

(c) placing said decorative layer across said mold cover overlying at least a portion of said cavity space;

(d) aligning said mold core and said mold cover to form a first injection volume therebetween;

(e) injecting a first clear polymer against the front side of said decorative layer to substantially conform said decorative layer against the core side of said first injection volume thereby forming a decorative composite comprising an outer layer at least partially formed in front of said decorative layer;

(f) solidifying said outer layer;

(g) retracting said core from said cover and removing said decorative composite;

(h) providing a second mold core and second mold cover which cooperate to form a second cavity space;

(i) placing said decorative composite upon said second mold cover;

(j) aligning the second mold cover and second mold core including said decorative composite to form a second injection volume;

(k) injecting a second polymer into said second injection volume against the back side of said decorative layer to form an backing layer; and (l) solidifying said second polymer to form a molded appliqué, wherein said molded appliqué has a thickness in the range of about 1.0 mm. to about 5.0 mm. and said outer layer has a thickness in the range of about 0.5 mm. to about 1.0 mm.

17. The method of claim 16 wherein said clear polymer comprises any one of polycarbonate, poly(methyl methacrylate), thermoplastic urethane, polyester, copolyester alloy, cyclic olefin copolymer, poly-4-methyl-1-pentene, polysulphone, allyl diglycol carbonate, allyl ester, styrene-acrylonitrile, polystyrene, polyvinyl chloride and blends, alloys and combinations thereof.

18. The method of claim 16 wherein one or more of said first or said second polymers includes one or more pigments, tints, colored dyes, metallic flakes or light reflective particles blended therein.

19. The method of claim 16 wherein said decorative layer comprises one of a film, a foil, a laminate, a veneer, a fabric or a coating.

20. The method of claim 19 wherein said veneer includes a wood grain pattern.

* * * * *